United States Patent [19]

Hughes

[11] 4,131,080
[45] Dec. 26, 1978

[54] UTENSIL FOR MAKING PIZZAS
[76] Inventor: Leroy A. Hughes, 1018 Green Hills Dr., Ann Arbor, Mich. 48105
[21] Appl. No.: 813,515
[22] Filed: Jul. 7, 1977
[51] Int. Cl.² .................... B05C 19/00; B05C 21/00
[52] U.S. Cl. ...................................... 118/13; 118/505
[58] Field of Search ............... 118/13, 504, 505, 301; 51/262 R, 265, 274, 310, 311, 312

[56] References Cited
U.S. PATENT DOCUMENTS

| | | | |
|---|---|---|---|
| 1,692,920 | 11/1928 | Baker | 118/504 |
| 2,954,752 | 10/1960 | Hayward | 118/505 |
| 3,007,401 | 11/1961 | Kordenbrock | 118/505 X |
| 3,192,896 | 7/1965 | Irving | 118/505 |

OTHER PUBLICATIONS
Popular Mechanics, vol. 122—No. 6, Dec. 1964, p. 165.

Primary Examiner—John McIntosh
Attorney, Agent, or Firm—Barnes, Kisselle, Raisch & Choate

[57] ABSTRACT

A thin walled cylinder open at both ends and having an outwardly extending flange at its lower end provides a shield useful for making pizzas. When the shield is placed on a sheet of pizza dough, its cylindrical wall surrounds the area of application of pizza topping ingredients and the flange provides a clean border around the edge of the finished pizza.

7 Claims, 5 Drawing Figures

U.S. Patent    Dec. 26, 1978    4,131,080
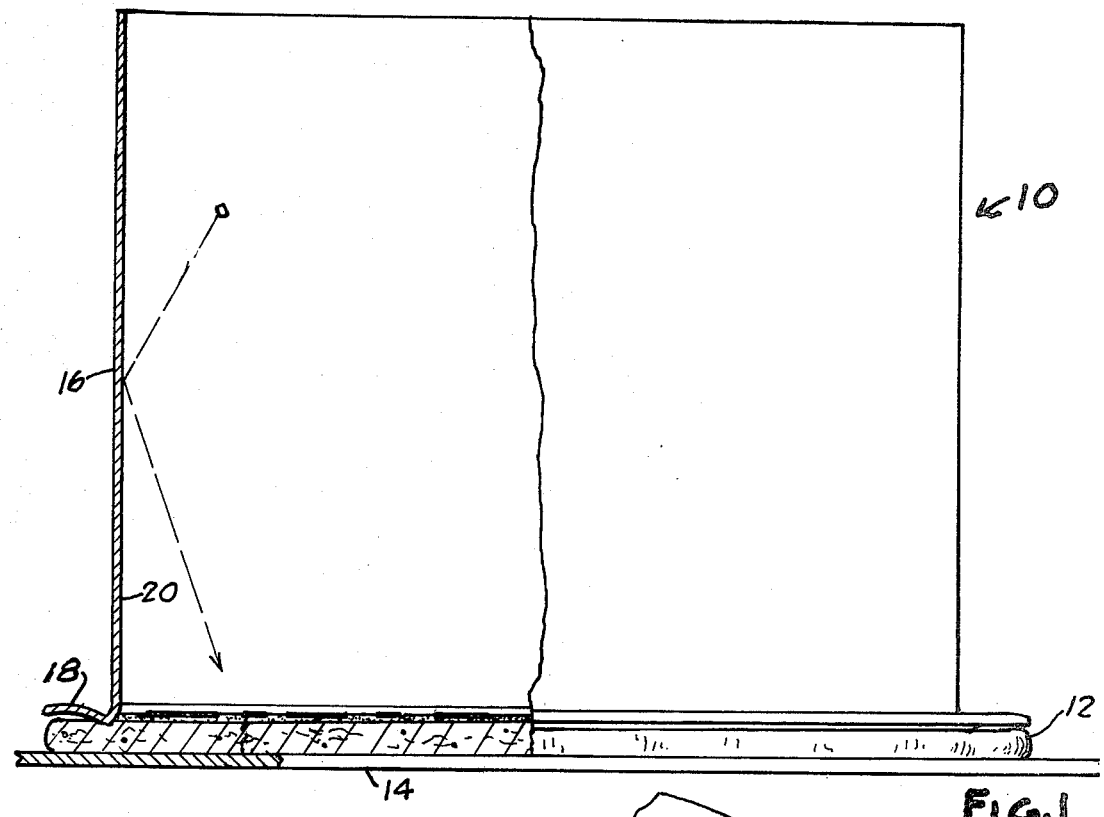
FIG. 1
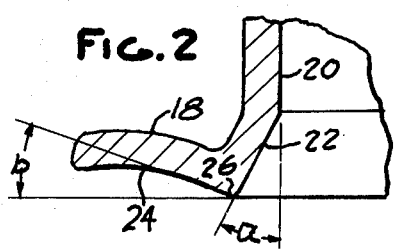
FIG. 2
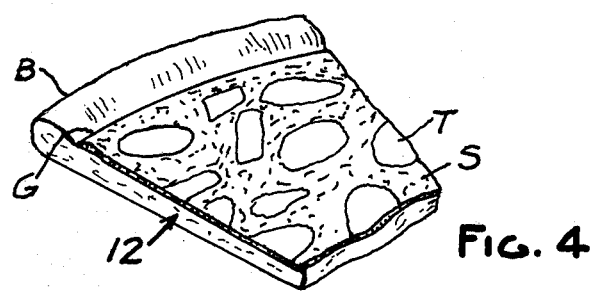
FIG. 4
FIG. 3
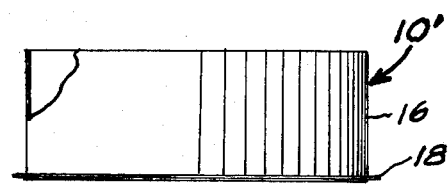
FIG. 5

UTENSIL FOR MAKING PIZZAS

This invention relates to a utensil for making pizza.

In the making of individual pizzas the dough is first worked into a flat sheet of the desired size, thickness and shape and then placed on a table or other support where the topping ingredients, such as tomato sauce, onions, peppers, sausage, etc., are spread over the top thereof. Thereafter the pizza is transferred to an oven for baking. The operation of applying the topping ingredients to the pizza frequently involves a considerable loss of ingredients (the amount of which varies with the dexterity of and care exercized by the pizza maker) and results in an unattractive finished pizza. This results from the fact that the topping ingredients are frequently hurriedly cast or spread over the top of the pizza in a manner such that at least some of these ingredients are overcast and end up on the floor or on the table on which the pizza dough is placed. For sanitary reasons, which require extreme cleanliness in all food handling operations, no attempt is made to salvage and reuse the overcast ingredients. Furthermore, pizza sauces are frequently spread or carelessly applied so that they tend to flow or drip over the outer edge of the pizza which results not only in waste, but also in an unattractive looking finished product.

The object of this invention is to provide a simple and economically constructed utensil which avoids the above referred to problems in the making of pizzas.

More specifically, the invention contemplates a shield in the form of a round, square or other regularly shaped cylinder having a transverse dimension slightly less than that of the intended pizza and having an outwardly extending flange at its lower end shaped in size to conform with the outer periphery of the desired pizza. The device is designed so that when the cylinder is placed on a sheet of pizza dough it provides a confined area for the application of topping ingredients to the pizza. The outer periphery of the flange not only provides a guide or template for making the pizza to the size and shape desired, but also provides a well defined uniform border around the edge of the finished pizza which is free of sauce and other topping ingredients.

Other objects, features and advantages of the present invention will become apparent from the following description and accompanying drawing, it which:

FIG. 1 is a side elevational view, partly in section, of a pizza with the shield of the present invention applied thereto in operative position;

FIG. 2 is a fragmentary sectional view on an enlarged scale of the lower end of the shield;

FIG. 3 is a fragmentary top elevational view of the shield;

FIG. 4 is a perspective view of a slice of a pizza made utilizing the shield of this invention; and FIG. 5 is a side elevational view, on a reduced scale, of a shield according to the present invention designed for making pizzas of substantially larger diameter than illustrated in FIG. 1.

In FIG. 1 the shield of the present invention is designated 10 and is shown applied to a thin layer of pizza dough 12 placed upon a screen or other support 14. Device 10 comprises a cylindrical shell 16 having an outwardly extending flange 18 at its lower end. Shell 10 and flange 18 can be formed of any suitable generally rigid material, such as wood, plastic or even sheet metal. The device preferably has a uniform thickness.

Referring to FIG. 2, adjacent its lower end the inner surface 20 of shell 10 is inclined outwardly in a downward direction, as indicated at 22. Likewise, the bottom surface of flange 18 is inclined upwardly in an outward direction as indicated at 24. The surfaces 22,24 intersect in a rounded edge 26 formed with a small radius. For reasons which will hereinafter become apparent, surface 22 is inclined to the horizontal at an angle which is preferably about 50 to 70°. Thus the angle a shown in FIG. 2 varies between 20 and 40°. Likewise, surface 24 is inclined to the horizontal at an angle b which is preferably about 20 to 40°. Accordingly, the included angle between surfaces 22, 24 varies between 70 and 110°. The radius at 26 is sufficiently small to present a rather clear line of demarcation between surfaces 22,24 and is preferably in the range of about 1/64" to 1/16". Flange 18 is relatively narrow in relation to the height of wall 16. For example, whereas wall 16 may have a height of between 3" to 7", the lateral extent of flange 18 should be on the order of about ½" to ¾" and preferably about ⅝". On the other hand, it is preferred that the vertical extent of the inclined surface 22 be substantially less than the lateral extent of flange 18, preferably on the order of about ¼" or less.

Regardless of whether the device is made of wood, plastic or sheet metal, it should be dimensioned so that it is relatively light in weight so that the rounded edge 26 will not penetrate too deeply into the pizza dough. Accordingly, if the device is formed of sheet metal, the material should have a thickness of not more than about 1/32" and the radius at the rounded edge 26 should be on the order of about 1/16". On the other hand, if the device is formed of a very light weight material, the radius at edge 26 should be less and can be as little as 1/64". In any event, the inclined surfaces 22,24 should not intersect in an edge which, in relation to the weight of the shield, is so sharp as to actually cut into the top surface of the dough. The inclination of surfaces 22,24 and the radius of edge 26 should be so related that the weight of the device simply causes the rounded edge 26 to form a well defined shallow groove G in the dough. This groove should have a depth of not more than about 1/16". Thus, the inclination of surfaces 22,24 and the radius of edge 26 will depend upon the size of the shield and the nature of the material from which it is fabricated.

The height of wall 16 is sufficient to prevent overcasting the topping ingredients beyond the shield. Except to the extent that the material from which the shield is fabricated affects its weight in relation to the transverse dimension, the height of wall 16 need not vary with shields of different sizes. For example, the shield 10' shown in FIG. 5 may have a diameter of as much as 18" and yet the wall 16 thereof may be of the same height as that of shield 10 shown in FIG. 1 which has a diameter of only 10". In any event, as a practical matter, the height of the shield wall is less than the transverse dimension of the shield.

In using the device, after the dough is worked to the desired thickness and shape the shield 10 is placed on the top surface of the dough as shown in FIG. 1. It will be noted that throughout the major portion of its lateral extent flange 18 is spaced above the underlying top surface of the dough. Thus, if at certain portions around the periphery the dough initially extends outwardly beyond the outer edge of flange 18, the user can merely tuck the dough inwardly under the flange 18 so that the pizza will conform quite accurately in size and shape to the outer periphery of this flange.

As pointed out above, the dimensions and weight of the shield are correlated so that the rounded edge 26 will penetrate slightly into the top surface of the dough and form a well defined groove G therein. As the topping ingredients are spread over the surface of the dough the wall 16 forms an enclosure of regular shape which limits the area over which the topping ingredients will be spread. This is true even though the user may cast ingredients against wall 16, in which case the wall serves as a deflection baffle as indicated by the arrow in FIG. 1.

At the same time, the rounded edge 26, by reason of its penetration into the top surface of the dough, tends to hold the dough taut and overcomes the natural tendency for the dough to shrink and change its shape while the topping ingredients are being spread thereover. Thus, the shield retains the dough in the desired shape and size until it is removed and the pizza is placed in the oven. Obviously, this results in a finished pizza of uniform shape and of a predetermined dimension. The penetration of the rounded edge 26 into the dough also prevents the sauces applied to the top face of the pizza from spreading outwardly beyond the groove G defined by the edges 22,24. The unsightly appearance of a pizza with the sauce running over the outer edge thereof is completely avoided by using the shield of this invention. The topping ingredients T and the sauce S do not extend outwardly beyond groove G and can be spread quite uniformly over the entire area of the pizza lying within the boundry of groove G. As a matter of fact, the finished pizza has an outer border B of uniform width which is free of all topping ingredients and which, if the pizza is properly baked, presents an attractive golden brown rim around the edge of the pizza. In no event should the edge 26 actually cut into the pizza dough. If this occurs it would result in the sauce penetrating into the dough, which many persons would consider to detract from the taste of the baked pizza.

After the desired topping ingredients are spread over the dough within the confines of wall 16, the shield is lifted off the pizza and the pizza is placed in the oven. The fact that the flange 18 is spaced above the underlying top surface of the dough in combination with the inclined surfaces 22,24 enables the shield to be lifted freely off the dough without sticking and without pulling or tearing the dough upwardly. At the same time, the outwardly inclined surface 22 at the lower edge of wall 16 has an additional function, namely, it also prevents the sauce and/or the other topping materials from being dragged upwardly with the shield when it is lifted off of the pizza.

I claim:

1. A shield for use in making pizzas comprising, a cylindrical shield having a vertically extending side wall and an outwardly extending flange at the lower edge thereof, the lateral dimension encompassed by said side wall being many times the lateral dimension of said flange, the lower end portion of the side wall at the inner periphery thereof being inclined outwardly and downwardly, the bottom face of said flange intersecting the lower edge of said outwardly inclined wall portion in a rounded edge spaced slightly laterally outwardly from the inner periphery of the portion of the side wall above said outwardly inclined portion, the bottom face of said flange being inclined upwardly and outwardly from said rounded edge, the included angle between the bottom face of said flange and said outwardly inclined wall portion being at least about 70° and the bottom face of the flange being inclined to the horizontal at a lesser angle than said outwardly inclined wall portion, whereby, when the shield is placed upon a flattened blank of pizza dough of slightly larger size than the lateral dimensions of the shield, the outer periphery of the flange is spaced above the dough and enables portions of the dough extending outwardly beyond the outer periphery of the flange to be tucked thereunder to conform the pizza dough blank to the lateral dimensions of the shield and the outwardly inclined portion of the side wall cooperates with said rounded edge and said upwardly inclined flange to form in the pizza dough a V-shaped groove having a rounded bottom which is spaced uniformly slightly inwardly from the outer periphery of the dough blank.

2. A shield as called for in claim 1 wherein the width of the flange is not more than about ⅜".

3. A shield as called for in claim 2 wherein the height of the shell is between about 3" and 7".

4. A shield as called for in claim 1 wherein said rounded edge has a radius of about 1/64" to 1/16".

5. A shield as called for in claim 1 wherein the inclined wall portion is inclined to the horizontal at an angle of about 50 to 70°.

6. A shield as called for in claim 5 wherein the bottom face of the flange is inclined to the horizontal at an angle of about 20 to 40°.

7. A shield as called for in claim 1 wherein the vertical extent of the inclined wall portion of the shell is less than the width of said flange.

* * * * *